US012287290B2

(12) United States Patent
Tao

(10) Patent No.: US 12,287,290 B2
(45) Date of Patent: Apr. 29, 2025

(54) MICROSCOPIC RAMAN DEVICE

(71) Applicant: SHIMADZU CORPORATION, Kyoto (JP)

(72) Inventor: Tomoyo Tao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 122 days.

(21) Appl. No.: 18/227,296

(22) Filed: Jul. 27, 2023

(65) Prior Publication Data

US 2024/0044800 A1 Feb. 8, 2024

(30) Foreign Application Priority Data

Aug. 3, 2022 (JP) ................................. 2022-123890

(51) Int. Cl.
*G01J 3/44* (2006.01)
*G01N 21/65* (2006.01)

(52) U.S. Cl.
CPC ....... *G01N 21/65* (2013.01); *G01N 2021/653* (2013.01); *G01N 2201/06113* (2013.01); *G01N 2201/0636* (2013.01); *G01N 2201/0648* (2013.01)

(58) Field of Classification Search
CPC ........ G01J 3/28; G01J 3/10; G01J 3/18; G01J 3/32; G01J 3/44; G01N 21/65
See application file for complete search history.

(56) References Cited

U.S. PATENT DOCUMENTS

| | | | | |
|---|---|---|---|---|
| 6,124,928 A | * | 9/2000 | Slater | G01J 3/44 356/318 |
| 11,460,343 B2 | * | 10/2022 | Charache | G01J 3/0227 |
| 2002/0067490 A1 | * | 6/2002 | Okawauchi | G03F 7/70633 356/614 |
| 2011/0109958 A1 | * | 5/2011 | Yokoi | G02B 21/06 359/385 |

(Continued)

FOREIGN PATENT DOCUMENTS

| | | |
|---|---|---|
| CN | 112505016 | 3/2021 |
| JP | H10-090064 | 4/1998 |
| JP | 5988676 | 9/2016 |

OTHER PUBLICATIONS

Search Report of Europe Counterpart Application, issued on Jan. 5, 2024, pp. 1-8.

*Primary Examiner* — Abdullahi Nur
(74) *Attorney, Agent, or Firm* — JCIPRNET

(57) ABSTRACT

Provided is a microscopic Raman device including: a first laser light source that generates a first laser light; a second laser light source that generates a second laser light having a wavelength different from a wavelength of the first laser light; a first optical element; a second optical element; a third optical element; a fourth optical element; and a spectrometer. When the first laser light is reflected by the first optical element and passes through the third optical element to irradiate a sample, a first Raman scattered light is generated from the sample. When the second laser light is sequentially reflected by the second optical element, the fourth optical element, and the third optical element to irradiate the sample, a second Raman scattered light is generated from the sample. The first Raman scattered light passes through the third optical element and the first optical element to enter the spectrometer.

4 Claims, 5 Drawing Sheets

(56) References Cited

U.S. PATENT DOCUMENTS

| | | | |
|---|---|---|---|
| 2013/0293882 A1* | 11/2013 | Dottery | G01J 3/44 356/301 |
| 2018/0196246 A1* | 7/2018 | Bares | G01J 3/0208 |
| 2019/0369025 A1* | 12/2019 | Yang | A61B 5/4547 |

* cited by examiner

MICROSCOPIC RAMAN DEVICE

CROSS REFERENCE TO RELATED APPLICATIONS

The application claims the priority benefit of Japanese Patent Application No. 2022-123890, filed on Aug. 3, 2022. The entirety of the above-mentioned patent application is hereby incorporated by reference herein and made a part of this specification.

TECHNICAL FIELD

The present disclosure relates to a microscopic Raman device.

BACKGROUND ART

For example, Japanese Patent Laying-Open No. 10-90064 discloses a microscopic Raman device. The microscopic Raman device described in Japanese Patent Laying-Open No. 10-90064 has an excitation laser, a spectrometer, and a detector. In the microscopic Raman device described in Japanese Patent Laying-Open No. 10-90064, when a sample is irradiated with a laser light from the excitation laser, a Raman scattered light is generated from the sample. The Raman scattered light is dispersed by the spectrometer, and the intensity distribution of the dispersed Raman scattered light is detected by the detector.

A microscopic Raman device may employ an optical element that reflects a laser light generated from a laser light source and that allows a Raman scattered light generated when a sample is irradiated with the laser light to pass therethrough. In the case where such a microscopic Raman device has a plurality of laser light sources, a switching needs to be made for the optical element when making the switching for a laser light source to be used. Upon the switching, the optical axis of the optical element may be deviated.

SUMMARY OF THE INVENTION

A microscopic Raman device provided in the present disclosure is a microscopic Raman device, in which an optical axis of an optical element can be prevented from being deviated due to the optical element being switched in response to a switching of a laser light source.

A microscopic Raman device of the present disclosure includes: a first laser light source that generates a first laser light; a second laser light source that generates a second laser light having a wavelength different from a wavelength of the first laser light; a first optical element; a second optical element; a third optical element; a fourth optical element; and a spectrometer. When the first laser light is reflected by the first optical element and passes through the third optical element to irradiate a sample, a first Raman scattered light is generated from the sample. When the second laser light is sequentially reflected by the second optical element, the fourth optical element, and the third optical element to irradiate the sample, a second Raman scattered light is generated from the sample. The first Raman scattered light passes through the third optical element and the first optical element to enter the spectrometer. The second Raman scattered light is sequentially reflected by the third optical element and the fourth optical element and passes through the second optical element to enter the spectrometer.

The foregoing and other objects, features, aspects, and advantages of the present invention will become more apparent from the following detailed description of the present invention, when taken in conjunction with the accompanying drawings.

DESCRIPTION OF EMBODIMENTS

Figure 1:
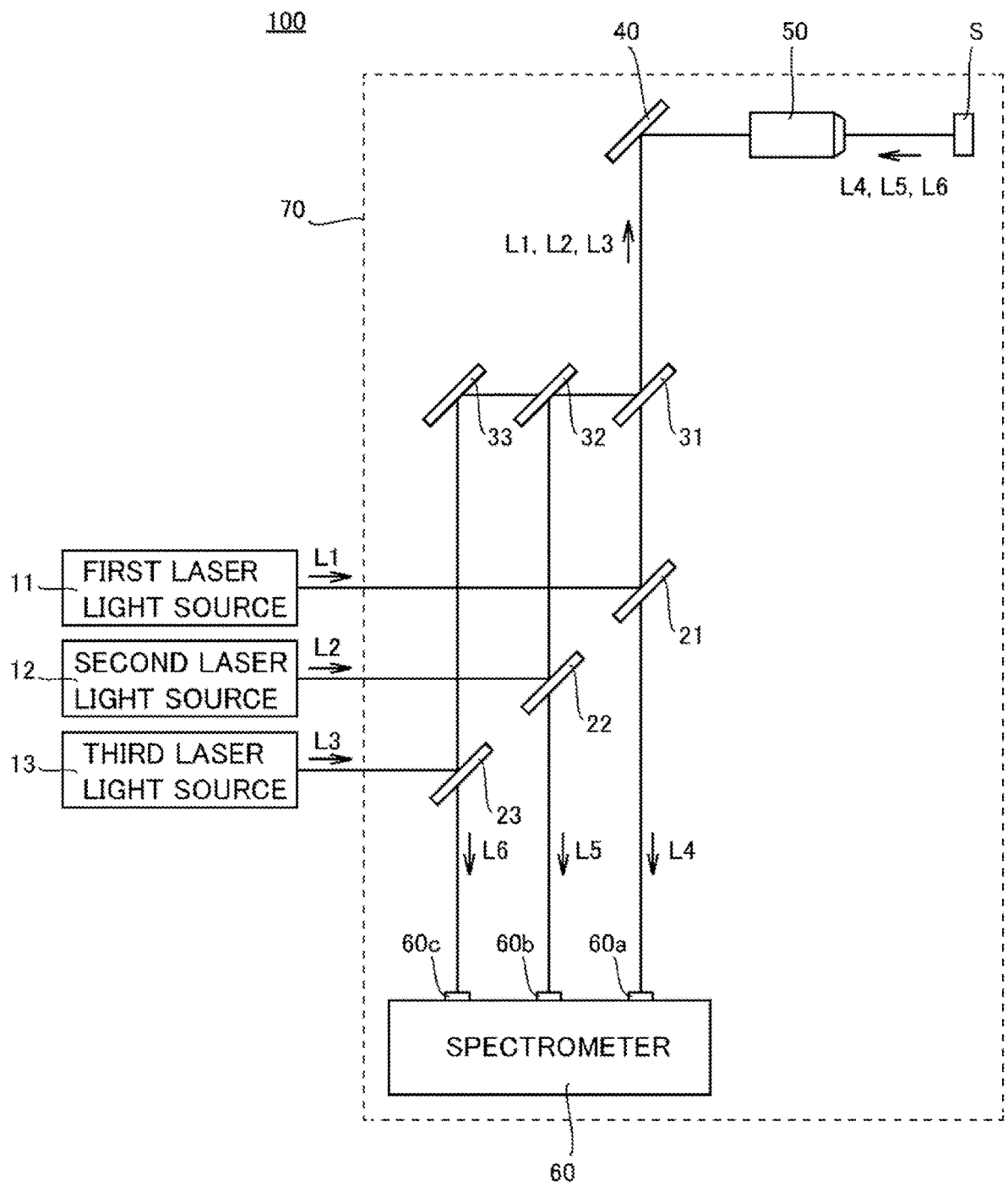
FIG. 1 is a schematic diagram of a microscopic Raman device 100.

Details of embodiments of the present disclosure will be described with reference to figures. In the figures described below, the same or corresponding portions are denoted by the same reference characters and the same explanation will not be described repeatedly.

First Embodiment

A microscopic Raman device according to a first embodiment will be described. Hereinafter, the microscopic Raman device according to the first embodiment will be referred to as a microscopic Raman device 100.

Configuration of Microscopic Raman Device 100

A configuration of a microscopic Raman device 100 will be described below.

FIG. 1 is a schematic diagram of a microscopic Raman device 100. As shown in FIG. 1, the microscopic Raman device 100 has a first laser light source 11, a second laser light source 12, and a third laser light source 13, a dichroic beam splitter 21, a dichroic beam splitter 22, a dichroic beam splitter 23, a dichroic beam splitter 31, a dichroic beam splitter 32, a mirror 33, a mirror 40, an objective lens 50, and a spectrometer 60. The first laser light source 11, the second laser light source 12, the third laser light source 13, the dichroic beam splitter 21, the dichroic beam splitter 22, the dichroic beam splitter 23, the dichroic beam splitter 31, the dichroic beam splitter 32, the mirror 33, the mirror 40, the objective lens 50, and the spectrometer 60 are disposed inside a housing 70.

The first laser light source 11 generates a first laser light L1. The wavelength of the first laser light L1 is defined as a wavelength $\lambda 1$. The second laser light source 12 generates a second laser light L2. The wavelength of the second laser light L2 is defined as a wavelength $\lambda 2$. The wavelength $\lambda 2$ is different from the wavelength $\lambda 1$. The wavelength $\lambda 2$ is shorter than the wavelength $\lambda 1$, for example. The third laser light source 13 generates a third laser light L3. The wavelength of the third laser light L3 is defined as a wavelength $\lambda 3$. The wavelength $\lambda 3$ is different from the wavelength $\lambda 1$ and is different from the wavelength $\lambda 2$. The wavelength $\lambda 3$ is shorter than the wavelength $\lambda 2$, for example.

The first laser light L1 is reflected by the dichroic beam splitter 21. The first laser light L1 reflected by the dichroic beam splitter 21 passes through the dichroic beam splitter 31. The first laser light L1 having passed through the dichroic beam splitter 31 is reflected by the mirror 40. The first laser light L1 reflected by the mirror 40 passes through the objective lens 50 to irradiate a sample S.

The second laser light L2 is reflected by the dichroic beam splitter 22. The second laser light L2 reflected by the dichroic beam splitter 22 is reflected by the dichroic beam splitter 32. The second laser light L2 reflected by the dichroic beam splitter 32 is reflected by the dichroic beam splitter 31. The second laser light L2 reflected by the dichroic beam splitter 31 is reflected by the mirror 40. The second laser light L2 reflected by the mirror 40 passes through the objective lens 50 to irradiate the sample S.

The third laser light L3 is reflected by the dichroic beam splitter 23. The third laser light L3 reflected by the dichroic beam splitter 23 is reflected by the mirror 33. The third laser light L3 reflected by the mirror 33 passes through the dichroic beam splitter 32. The third laser light L3 having passed through the dichroic beam splitter 32 is reflected by the dichroic beam splitter 31.

The third laser light L3 reflected by the dichroic beam splitter 31 is reflected by the mirror 40. The third laser light L3 reflected by the mirror 40 passes through the objective lens 50 to irradiate the sample S. An optical path between the dichroic beam splitter 31 and the sample S is the same among the first laser light L1, the second laser light L2, and the third laser light L3.

When the sample S is irradiated with the first laser light L1, a first Raman scattered light L4 is generated. The wavelength of the first Raman scattered light L4 is defined as a wavelength $\lambda 4$. The wavelength $\lambda 4$ is longer than the wavelength $\lambda 1$. The first Raman scattered light L4 passes through the objective lens 50 and is reflected by the mirror 40. The first Raman scattered light L4 reflected by the mirror 40 passes through the dichroic beam splitter 31. The dichroic beam splitter 31 allows each of the light having the wavelength $\lambda 1$ and the light having the wavelength $\lambda 4$ to pass therethrough, and reflects each of the light having the wavelength $\lambda 2$, the light having the wavelength $\lambda 3$, the light having the wavelength $\lambda 5$, and the light having the wavelength $\lambda 6$. The first Raman scattered light L4 having passed through the dichroic beam splitter 31 passes through the dichroic beam splitter 21.

When the sample S is irradiated with the second laser light L2, a second Raman scattered light L5 is generated. The wavelength of the second Raman scattered light L5 is defined as a wavelength $\lambda 5$. The wavelength $\lambda 5$ is longer than the wavelength $\lambda 2$. The second Raman scattered light L5 passes through the objective lens 50 and is reflected by the mirror 40. The second Raman scattered light L5 reflected by the mirror 40 is reflected by the dichroic beam splitter 31. The second Raman scattered light L5 reflected by the dichroic beam splitter 31 is reflected by the dichroic beam splitter 32. The second Raman scattered light L5 reflected by the dichroic beam splitter 32 passes through the dichroic beam splitter 22.

When the sample S is irradiated with the third laser light L3, a third Raman scattered light L6 is generated. The wavelength of the third Raman scattered light L6 is defined as a wavelength $\lambda 6$. The wavelength $\lambda 6$ is longer than the wavelength $\lambda 3$. The third Raman scattered light L6 passes through the objective lens 50 and is reflected by the mirror 40. The third Raman scattered light L6 reflected by the mirror 40 is reflected by the dichroic beam splitter 31. That is, an optical path between the sample S and the dichroic beam splitter 31 is the same among the first Raman scattered light L4, the second Raman scattered light L5, and the third Raman scattered light L6.

The third Raman scattered light L6 reflected by the dichroic beam splitter 31 passes through the dichroic beam splitter 32. The dichroic beam splitter 32 allows each of the light having the wavelength $\lambda 3$ and the light having the wavelength $\lambda 6$ to pass therethrough, and reflects each of the light having the wavelength $\lambda 2$ and the light having the wavelength $\lambda 5$. The third Raman scattered light L6 having passed through the dichroic beam splitter 32 is reflected by the mirror 33. The third Raman scattered light L6 reflected by the mirror 33 passes through the dichroic beam splitter 23. The optical paths of the first Raman scattered light L4, the second Raman scattered light L5, and the third Raman scattered light L6 after the dichroic beam splitter 31 are separated from one another.

The spectrometer 60 has a first channel 60a, a second channel 60b, and a third channel 60c. The first Raman scattered light L4 having passed through the dichroic beam splitter 21 enters the spectrometer 60 via the first channel 60a. The second Raman scattered light L5 having passed through the dichroic beam splitter 22 enters the spectrometer 60 via the second channel 60b. The third Raman scattered light L6 having passed through the dichroic beam splitter 23 enters the spectrometer 60 via the third channel 60c.

The spectrometer 60 has a grating 61, a grating 62, and a grating 63. It should be noted that, the grating 61, the grating 62, and the grating 63 are not shown. The grating 61, the grating 62, and the grating 63 are disposed inside the spectrometer 60. The spectrometer 60 further has a detector 64. It should be noted that, the detector 64 is not shown. The detector 64 is disposed inside the spectrometer 60.

The first Raman scattered light L4 having entered via the first channel 60a is dispersed by the grating 61 and the intensity distribution thereof is detected by the detector 64. The second Raman scattered light L5 having entered via the second channel 60b is dispersed by the grating 62 and the intensity distribution thereof is detected by the detector 64. The third Raman scattered light L6 having entered via the third channel 60c is dispersed by the grating 63 and the intensity distribution thereof is detected by the detector 64.

Effects of Microscopic Raman Device 100

Effects of the microscopic Raman device 100 will be described below in comparison with a microscopic Raman device (referred to as "microscopic Raman device 200") according to a comparative example.

Figure 2:
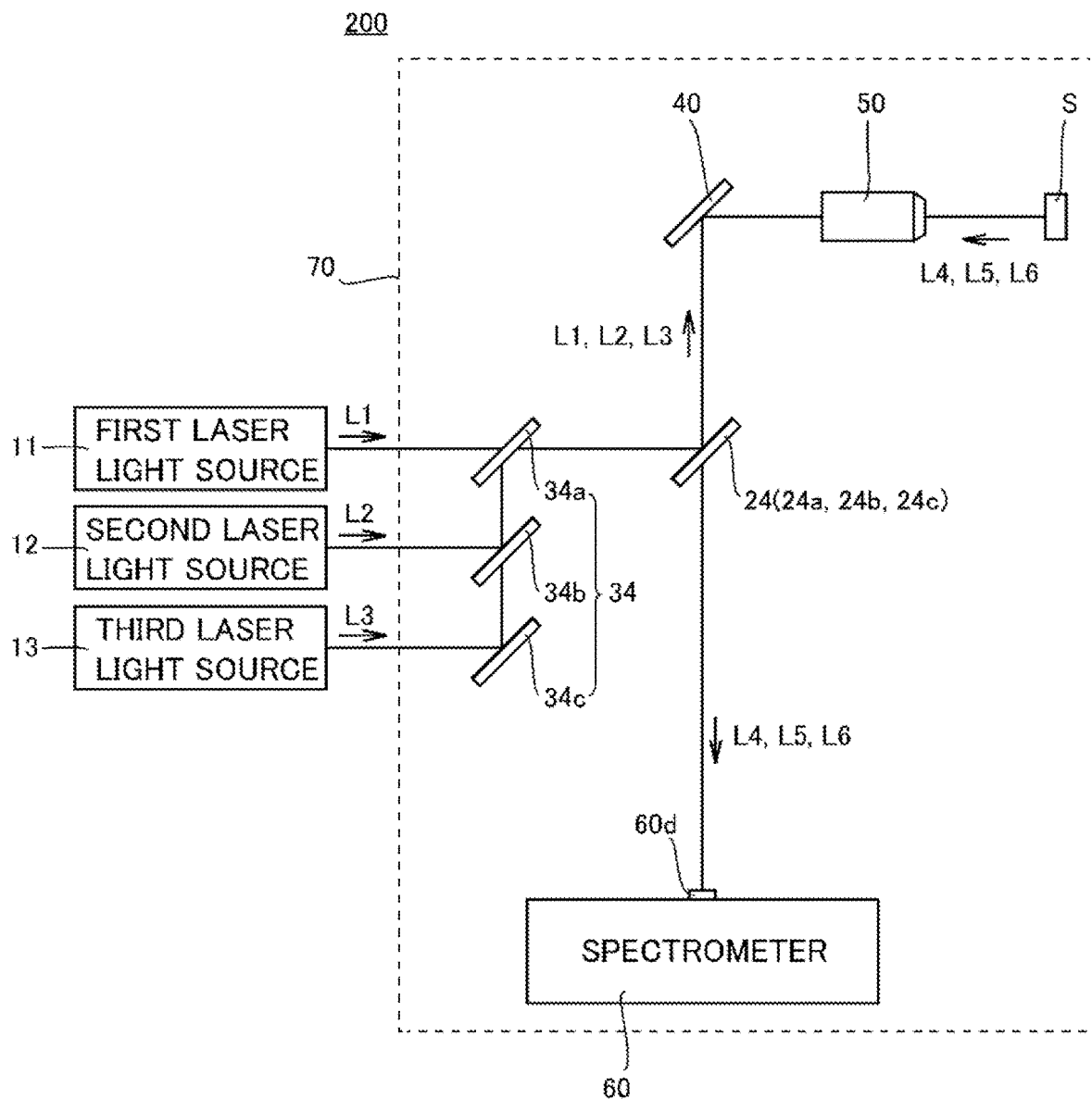
FIG. 2 is a schematic diagram of a microscopic Raman device 200.

FIG. 2 is a schematic diagram of a microscopic Raman device 200. As shown in FIG. 2, the microscopic Raman device 200 has a first laser light source 11, a second laser light source 12, and a third laser light source 13, a switching long-pass filter 24, a switching mirror 34, a mirror 40, an objective lens 50, a spectrometer 60, and a housing 70.

The switching long-pass filter 24 has a long-pass filter 24a, a long-pass filter 24b, and a long-pass filter 24c. The switching long-pass filter 24 is used with a switching being made to one of the long-pass filter 24a, the long-pass filter 24b, and the long-pass filter 24c. The switching mirror 34 has a mirror 34a, a mirror 34b, and a mirror 34c. In the switching mirror 34, each of the mirror 34a, the mirror 34b, and the mirror 34c is switchable to be used or not used.

When the first laser light source 11 is used, the switching long-pass filter 24 uses the long-pass filter 24a, and the switching mirror 34 does not use the mirror 34a. Thus, the first laser light L1 is reflected by the long-pass filter 24a and the mirror 40 and passes through the objective lens 50 to irradiate the sample S. The first Raman scattered light L4 is reflected by the mirror passes through the long-pass filter 24a, and enters the spectrometer 60 via a channel 60d.

When the second laser light source 12 is used, the switching long-pass filter 24 uses the long-pass filter 24b, and the switching mirror 34 uses the mirror 34a and the mirror 34b. Thus, the second laser light L2 is reflected by the mirror 34b, the mirror 34a, the long-pass filter 24b, and the mirror 40 and passes through the objective lens 50 to irradiate the sample S. The second Raman scattered light L5 is reflected by the mirror 40, passes through the long-pass filter 24b, and enters the spectrometer 60 via the channel 60d.

When the third laser light source 13 is used, the switching long-pass filter 24 uses the long-pass filter 24c, and the switching mirror 34 uses the mirror 34a and the mirror 34c and does not use the mirror 34b. Thus, the third laser light L3 is reflected by the mirror 34c, the mirror 34a, the long-pass filter 24b, and the mirror 40 and passes through the objective lens 50 to irradiate the sample S. The third Raman scattered light L6 is reflected by the mirror 40, passes through the long-pass filter 24c, and enters the spectrometer 60 via the channel 60d.

Each of the intensity distributions of the first Raman scattered light L4, the second Raman scattered light L5, and the third Raman scattered light L6 each having entered via the channel 60d is detected by the detector 64 with switching being made among the grating 61, the grating 62, and the grating 63 for the sake of use.

As described above, in the microscopic Raman device 200, when making switching among the first laser light source 11, the second laser light source 12, and the third laser light source 13, switching among the long-pass filter 24a, the long-pass filter 24b, and the long-pass filter 24c and switching among the mirror 34a, the mirror 34b, and the mirror 34c are also made, with the result that the optical axes of the long-pass filter 24a, the long-pass filter 24b and the long-pass filter 24c and the optical axes of the mirror 34a, the mirror 34b, and the mirror 34c may be deviated in response to the switching among the first laser light source 11, the second laser light source 12, and the third laser light source 13.

On the other hand, in the microscopic Raman device 100, when making switching among the first laser light source 11, the second laser light source 12, and the third laser light source 13, switching among the dichroic beam splitter 21, the dichroic beam splitter 22, and the dichroic beam splitter 23 and switching among the dichroic beam splitter 31, the dichroic beam splitter 32, and the mirror 33 are unnecessary. Therefore, according to the microscopic Raman device 100, the optical axes of the dichroic beam splitter 21, the dichroic beam splitter 22, and the dichroic beam splitter 23 and the optical axes of the dichroic beam splitter 31, the dichroic beam splitter 32, and the mirror 33 can be prevented from being deviated.

In the microscopic Raman device 100, since switching among the dichroic beam splitter 21, the dichroic beam splitter 22, and the dichroic beam splitter 23 and switching among the dichroic beam splitter 31, the dichroic beam splitter 32, and the mirror 33 are unnecessary, the housing 70 does not need to be opened when making switching among the first laser light source 11, the second laser light source 12, and the third laser light source 13, with the result that a laser exposure in response to switching among the first laser light source 11, the second laser light source 12 and the third laser light source 13 can be prevented. In the microscopic Raman device 100, switching among the grating 61, the grating 62, and the grating 63 in response to switching among the first laser light source 11, the second laser light source 12, and the third laser light source 13 can be also unnecessary.

Modification

Figure 3:
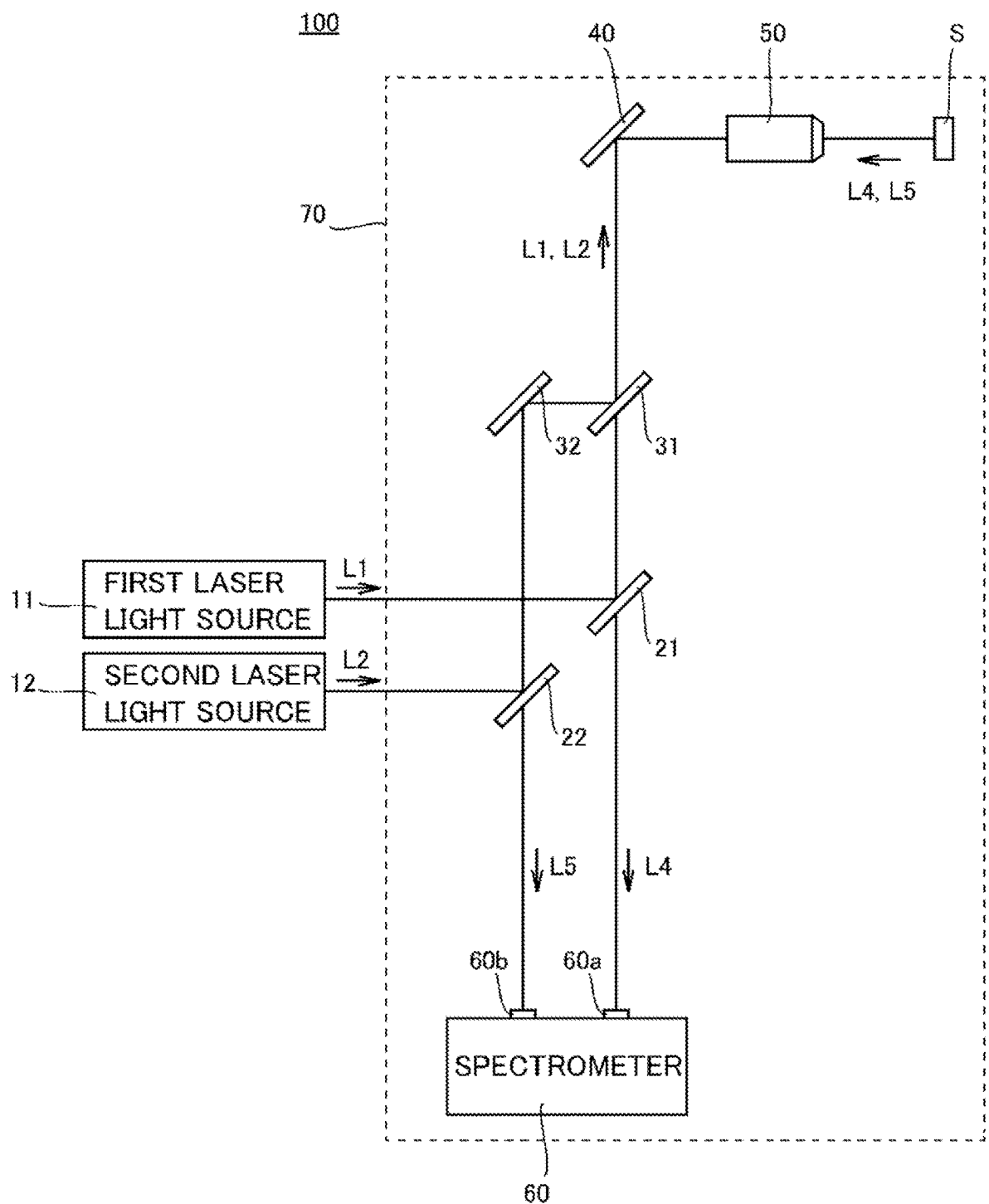
FIG. 3 is a schematic diagram of a microscopic Raman device 100 according to a modification.

FIG. 3 is a schematic diagram of a microscopic Raman device 100 according to a modification. As shown in FIG. 3, the microscopic Raman device 100 may not have the third laser light source 13, the dichroic beam splitter 23, and the mirror 33. In this case, the spectrometer 60 may not have the third channel 60c. That is, in the above example, the three laser light sources are used, but the number of laser light sources used may be two. The number of laser light sources used may be four or more. It should be noted that in this case, the number of dichroic beam splitters and the number of mirrors may be increased in accordance with the number of laser light sources.

Second Embodiment

A microscopic Raman device according to a second embodiment will be described. Hereinafter, the microscopic Raman device according to the second embodiment will be referred to as a microscopic Raman device 300. Here, differences from the microscopic Raman device 100 will be mainly described and the same explanation will not be described repeatedly.

Configuration of Microscopic Raman Device 300

A configuration of a microscopic Raman device 300 will be described below.

Figure 4:
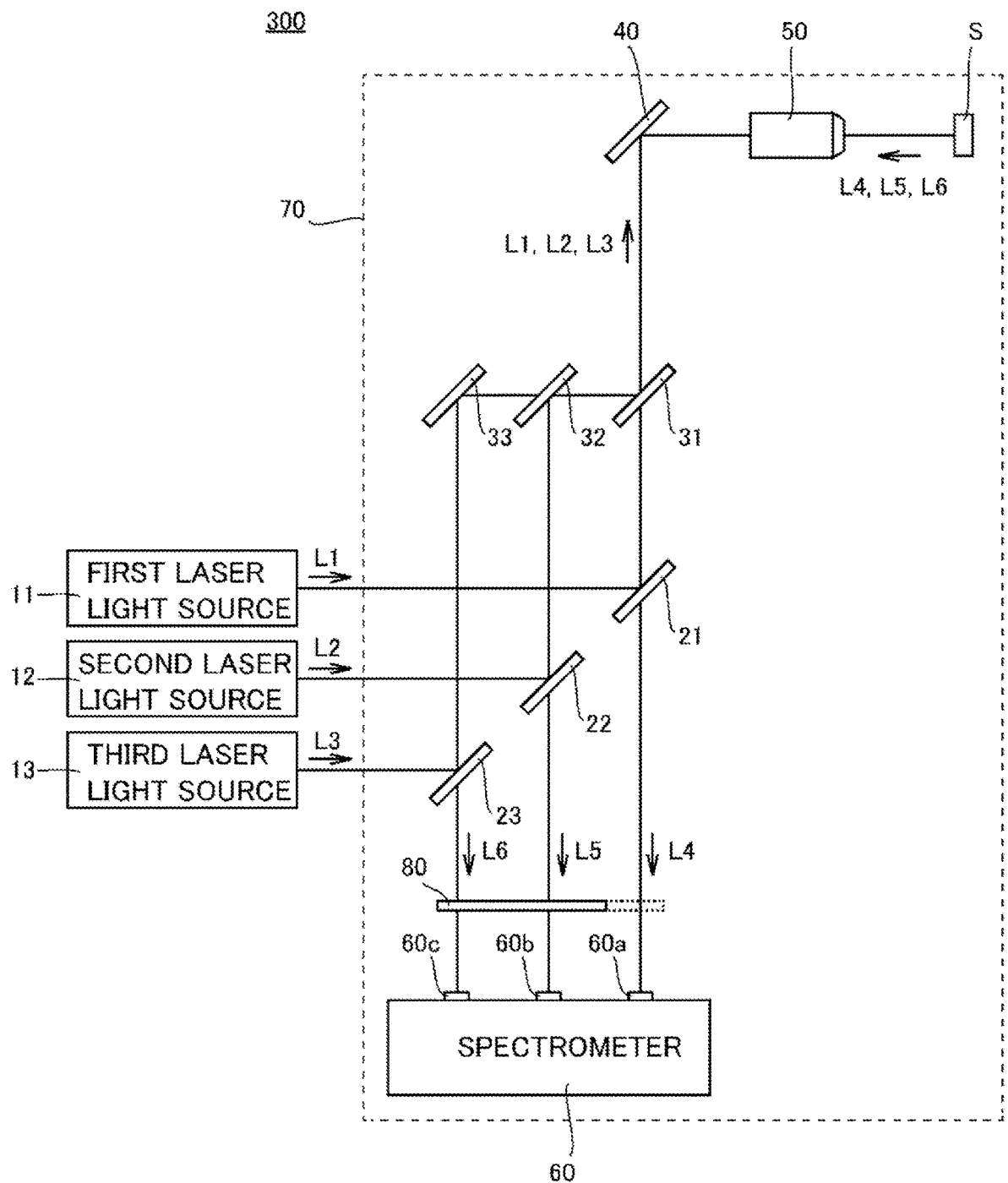
FIG. 4 is a schematic diagram of a microscopic Raman device 300.

FIG. 4 is a schematic diagram of a microscopic Raman device 300. As shown in FIG. 4, the microscopic Raman device 300 has a first laser light source 11, a second laser light source 12, a third laser light source 13, a dichroic beam splitter 21, a dichroic beam splitter 22, a dichroic beam splitter 23, a dichroic beam splitter 31, a dichroic beam splitter 32, a mirror 33, a mirror 40, an objective lens 50, a spectrometer 60, and a housing 70. Regarding this point, the configuration of the microscopic Raman device 300 is the same as the configuration of the microscopic Raman device 100.

The microscopic Raman device 300 further has a shutter 80. The shutter 80 selectively allows for passing of one of the first Raman scattered light L4, the second Raman scattered light L5, and the third Raman scattered light L6. The shutter 80 is disposed, for example, between the spectrometer 60 and each of the dichroic beam splitter 31, the dichroic beam splitter 32, and the mirror 33.

The shutter 80 is preferably disposed between the spectrometer 60 and each of the dichroic beam splitter 21, the dichroic beam splitter 22, and the dichroic beam splitter 23. That is, the shutter 80 preferably selectively allows for passing of one of the first Raman scattered light L4 having passed through the dichroic beam splitter 21, the second Raman scattered light L5 having passed through the dichroic beam splitter 22, and the third Raman scattered light L6 having passed through the dichroic beam splitter 23, thereby causing the light to enter the spectrometer 60. Regarding these points, the configuration of the microscopic Raman device 300 is different from the configuration of the microscopic Raman device 100.

Effects of Microscopic Raman Device 300

Effects of the microscopic Raman device 300 will be described below.

When the sample S is irradiated with the first laser light L1, a first anti-Stokes light may be generated from the sample S in addition to the first Raman scattered light L4. The wavelength of the first anti-Stokes light is shorter than the wavelength λ1. Therefore, the first anti-Stokes light may be sequentially reflected by the mirror 40, the dichroic beam splitter 31, and the dichroic beam splitter 32, and may pass through the dichroic beam splitter 22 to enter the spectrometer 60. Further, the first anti-Stokes light may be sequentially reflected by the mirror 40 and the dichroic beam splitter 31, may pass through the dichroic beam splitter 32, may be reflected by the mirror 33, and may pass through the dichroic beam splitter 23 to enter the spectrometer 60.

When the first anti-Stokes light enters the spectrometer 60, not only the first Raman scattered light L4 but also the first anti-Stokes light reach the detector 64. As a result, the intensity distribution of the first Raman scattered light L4 cannot be precisely detected. The same also applies to a second anti-stokes light generated when the sample S is irradiated with the second laser light L2.

On the other hand, in the microscopic Raman device 300, the shutter 80 selectively allows for passing of one of the first Raman scattered light L4, the second Raman scattered light L5, and the third Raman scattered light L6. Therefore, in the microscopic Raman device 300, when the first Raman scattered light L4 passes at the shutter 80, the first anti-Stokes light is blocked by the shutter 80, whereas when the second Raman scattered light L5 passes at the shutter 80, the second anti-Stokes light is blocked by the shutter 80. Therefore, according to the microscopic Raman device 300, the intensity distribution of the Raman scattered light from the sample S can be more precisely detected.

When the shutter 80 selectively allows for passing of the first Raman scattered light L4 having passed through the dichroic beam splitter 21, the second Raman scattered light L5 having passed through the dichroic beam splitter 22, and the third Raman scattered light L6 having passed through the dichroic beam splitter 23, the shutter 80 is disposed near the spectrometer 60, with the result that stray light can be prevented from entering the spectrometer 60.

Third Embodiment

A microscopic Raman device according to a third embodiment will be described. Hereinafter, the microscopic Raman device according to the third embodiment will be referred to as a microscopic Raman device 400. Here, differences from the microscopic Raman device 100 will be mainly described and the same explanation will not be described repeatedly.

Configuration of Microscopic Raman Device 400

A configuration of a microscopic Raman device 400 will be described below.

Figure 5:
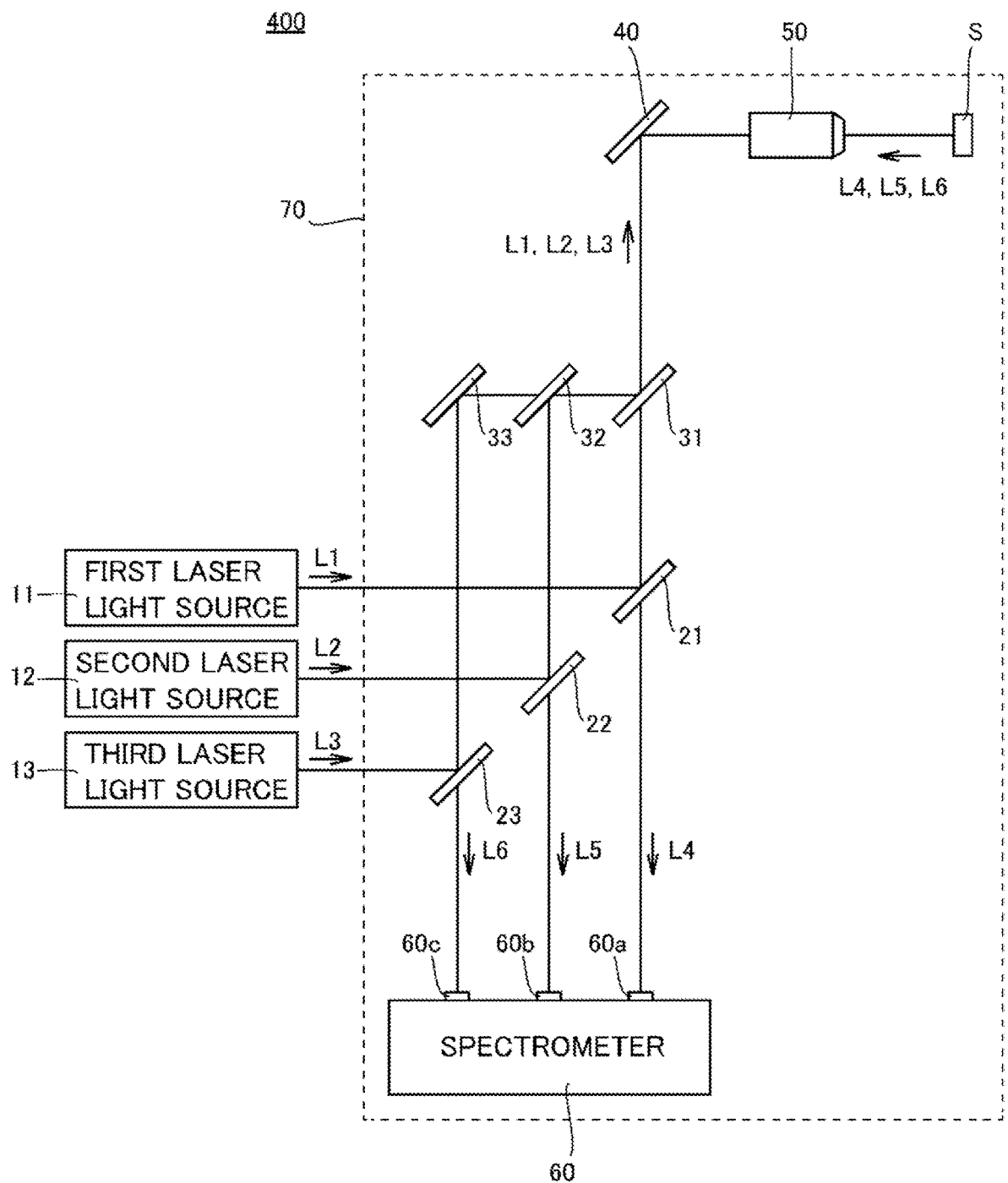
FIG. 5 is a schematic diagram of a microscopic Raman device 400.

FIG. 5 is a schematic diagram of a microscopic Raman device 400. As shown in FIG. 5, the microscopic Raman device 400 has a first laser light source 11, a second laser light source 12, a third laser light source 13, a dichroic beam splitter 21, a dichroic beam splitter 22, a dichroic beam splitter 23, a dichroic beam splitter 31, a dichroic beam splitter 32, a mirror 33, a mirror 40, an objective lens 50, a spectrometer 60, and a housing 70. Regarding this point, the configuration of the microscopic Raman device 400 is the same as the configuration of the microscopic Raman device 100.

In the microscopic Raman device 400, one of the first Raman scattered light L4, the second Raman scattered light L5, and the third Raman scattered light L6 is selectively allowed to enter the spectrometer 60 by opening or closing the first channel 60a, the second channel 60b, and the third channel 60c. Regarding this point, the configuration of the microscopic Raman device 400 is different from the configuration of the microscopic Raman device 100.

Effects of Microscopic Raman Device 400

Effects of the microscopic Raman device 400 will be described below.

In the microscopic Raman device 400, one of the first Raman scattered light L4, the second Raman scattered light L5, and the third Raman scattered light L6 is selectively allowed to enter the spectrometer 60 by opening or closing a first channel 60a, a second channel 60b, and a third channel 60c. Therefore, in the microscopic Raman device 400, when the first Raman scattered light L4 passes through the first channel 60a, the first anti-Stokes light is blocked by the second channel 60b and the third channel 60c, whereas when the second Raman scattered light L5 passes through the second channel 60b, the second anti-Stokes light is blocked by the third channel 60c. Therefore, according to the microscopic Raman device 400, the intensity distribution of the Raman scattered light from the sample S can be more precisely detected.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A microscopic Raman device comprising:
   a first laser light source that generates a first laser light;
   a second laser light source that generates a second laser light having a wavelength different from a wavelength of the first laser light;
   a first optical element;
   a second optical element;
   a third optical element;
   a fourth optical element; and
   a spectrometer, wherein
   when the first laser light is reflected by the first optical element and passes through the third optical element to irradiate a sample, a first Raman scattered light is generated from the sample,
   when the second laser light is sequentially reflected by the second optical element, the fourth optical element, and the third optical element to irradiate the sample, a second Raman scattered light is generated from the sample,
   the first Raman scattered light passes through the third optical element and the first optical element to enter the spectrometer, and
   the second Raman scattered light is sequentially reflected by the third optical element and the fourth optical element and passes through the second optical element to enter the spectrometer.

2. The microscopic Raman device according to claim 1, further comprising:
a shutter,
wherein the shutter is configured to selectively allow for passing of one of the first Raman scattered light and the second Raman scattered light.

3. The microscopic Raman device according to claim 2, wherein
the shutter is configured to selectively allow for passing of one of the first Raman scattered light having passed through the first optical element and the second Raman scattered light having passed through the second optical element.

4. The microscopic Raman device according to claim 1, wherein
the spectrometer has a first channel via which the first Raman scattered light enters and a second channel via which the second Raman scattered light enters, and
one of the first Raman scattered light and the second Raman scattered light is selectively allowed to enter the spectrometer by opening or closing the first channel and the second channel.

\* \* \* \* \*